(12) United States Patent
Visairo-Cruz et al.

(10) Patent No.: US 7,535,122 B2
(45) Date of Patent: May 19, 2009

(54) VARIOUS METHODS AND APPARATUSES FOR A MULTIPLE INPUT-VOLTAGE-LEVEL VOLTAGE-REGULATOR AND A MULTIPLE VOLTAGE-LEVEL DC POWER SUPPLY

(75) Inventors: Horacio Visairo-Cruz, Jalisco (MX); Pavan Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 11/394,875

(22) Filed: Mar. 31, 2006

(65) Prior Publication Data

US 2007/0229044 A1    Oct. 4, 2007

(51) Int. Cl.
*H02J 1/00* (2006.01)
*H02J 3/00* (2006.01)

(52) U.S. Cl. .................................. 307/80; 307/43
(58) Field of Classification Search ............ 307/46, 307/50, 43, 80
See application file for complete search history.

(56) References Cited

U.S. PATENT DOCUMENTS

| 6,078,169 | A  | * | 6/2000 | Petersen ..................... 323/273 |
| 7,106,032 | B2 | * | 9/2006 | Chen et al. .................. 323/269 |
| 2003/0015992 | A1 | * | 1/2003 | Dubac et al. ............... 320/121 |

* cited by examiner

*Primary Examiner*—Stephen W Jackson
*Assistant Examiner*—Carlos Amaya
(74) *Attorney, Agent, or Firm*—Blakely, Sokoloff, Taylor & Zafman LLP

(57) ABSTRACT

A method, apparatus, and system are described in which operating characteristics of voltage regulator (VR) may be controlled. Example operating characteristics that are controlled may be 1) power conversion efficiency based on load demand on the VR, 2) response rate to a transient deviation from a regulated output parameter, such as voltage or current, of the VR based on either 1) measured load or 2) receipt of an indication from a first load communicating that anticipated load conditions may cause the transient deviation from a set point of the regulated output parameter due to a significant change in load demand, or other similar operating characteristic. The VR may select an operating input voltage from two or more input voltages to control the operating characteristics of the VR by receiving a selection signal. Other embodiments are described.

22 Claims, 9 Drawing Sheets

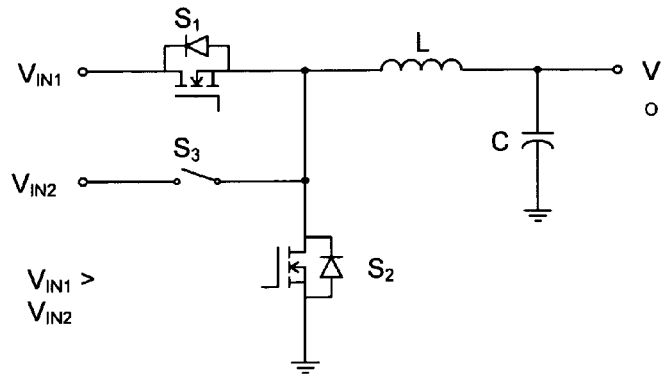
Figure 8a
| | CODE | | High Load | Light Load | Vin | Fs |
|---|---|---|---|---|---|---|
| | 1 | — | CCM | CCM | 12V | 300kHz |
| 860 | 2 | — | CCM | DCM | 12V | 300kHz |
| | 3 | — | CCM | DCM | 12V | 75kHz |
| | 4 | — | CCM | DCM | 3V | 75kHz |
Figure 8b
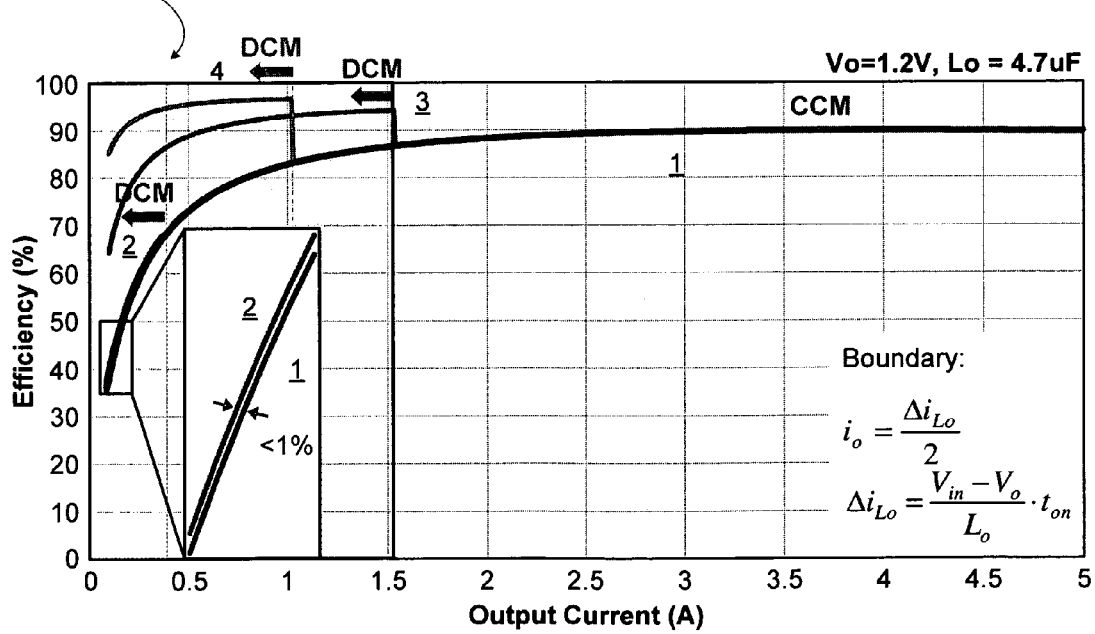
Figure 8c

VARIOUS METHODS AND APPARATUSES FOR A MULTIPLE INPUT-VOLTAGE-LEVEL VOLTAGE-REGULATOR AND A MULTIPLE VOLTAGE-LEVEL DC POWER SUPPLY

FIELD

Aspects of embodiments of the invention relate to the field of supplying multiple levels of an operating voltage to components in a device; and more specifically, to a multiple input-voltage-level voltage-regulator and a multiple voltage-level Direct Current (DC) power supply.

BACKGROUND

Portable computing equipment relies on battery systems to provide back-up power when the Alternating Current (AC) mains are unavailable. The duration that portable computing equipment system can operate on the DC battery depends on many factors including size of the battery, amount of energy drawn from the unit while performing different functions and power conversion efficiency of the voltage regulators.

BRIEF DESCRIPTION OF THE DRAWINGS

The drawings refer to embodiments of the invention in which:

FIGS. 8a-8c illustrate a schematic diagram and corresponding chart and table for a variable input voltage and a variable frequency operation of an embodiment of the VR.

Figure 1:
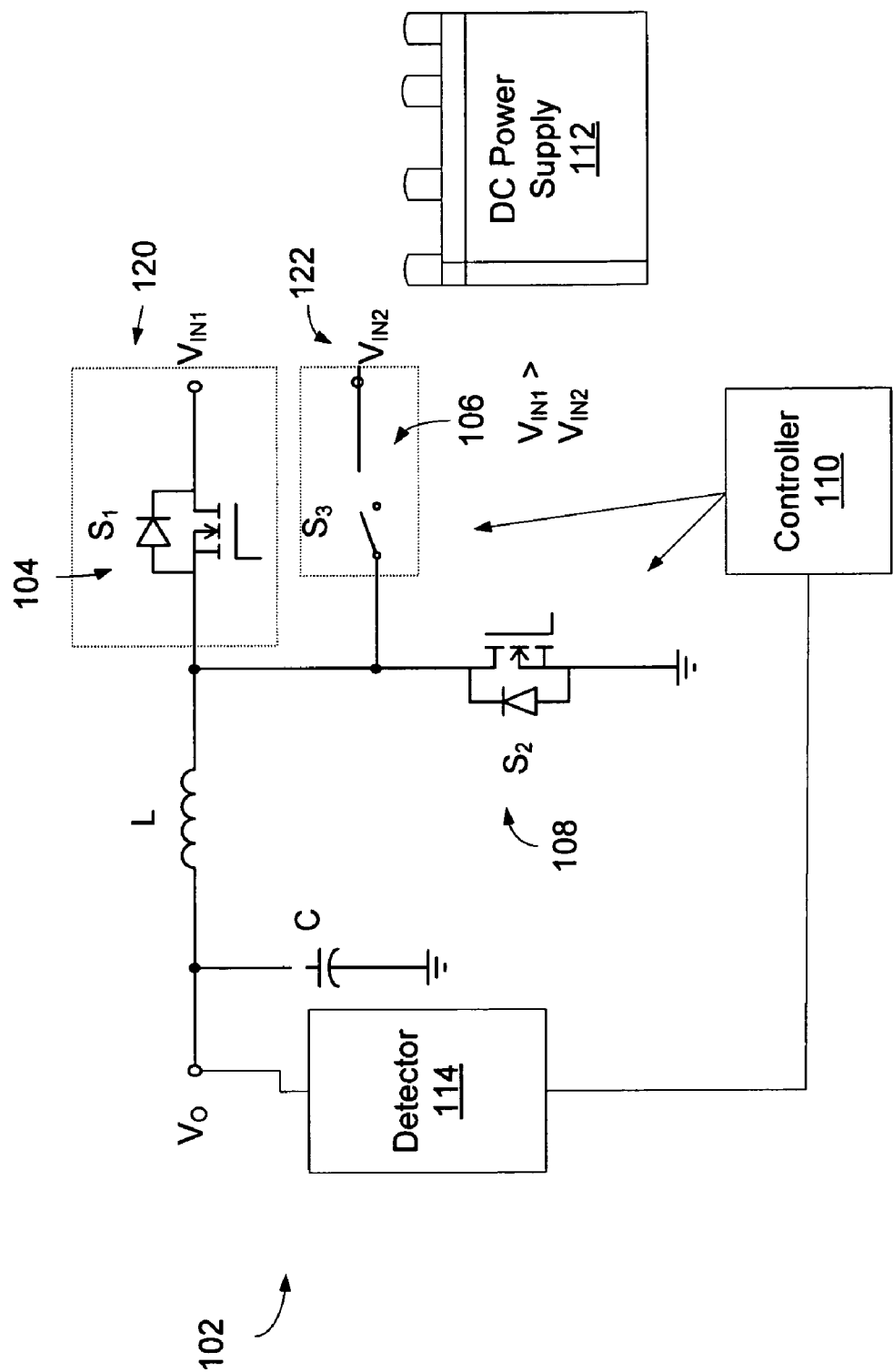
FIG. 1 illustrates a schematic diagram of an embodiment of a multiple input-voltage-level voltage-regulator (VR) having two input stages to dynamically reconfigure selection between multiple input-voltages to control operating characteristics of the VR.

While the invention is subject to various modifications and alternative forms, specific embodiments thereof have been shown by way of example in the drawings and will herein be described in detail. The embodiments of the invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of voltage-levels, etc., in order to provide a thorough understanding of the embodiments of the invention. It will be apparent, however, to one of ordinary skill in the art that the embodiments of the invention may be practiced without these specific details. However, the specific numeric reference should not be interpreted as a literal sequential order but rather interpreted that the first voltage-level is different than a second voltage-level. Thus, the specific details set forth are merely exemplary. The specific details may be varied from and still be contemplated to be within the spirit and scope of the present invention.

In general, various methods and apparatuses are described for a multiple input-voltage-level voltage-regulator (VR) and a multiple voltage-level Direct Current (DC) power source. The multiple input-voltage-level voltage-regulator (VR) may dynamically reconfigure selection between the multiple input-voltages to control operating characteristics of the VR. A few example operating characteristics of the VR are 1) power conversion efficiency based on load demand on the VR over a wide range of load demand, 2) response rate to a transient deviation from a regulated output parameter, such as voltage or current, of the VR based on either 1) measured load or 2) receipt of a signal indicating an anticipated load change, or 3) similar operating characteristic of the VR. The VR may have many stages. A first stage may receive a first input-voltage-level. The first stage at that first input-voltage-level is designed to operate above a certain power conversion efficiency level for a high power level outputted from the VR. Similarly, a second stage may receive a second input voltage-level. The second stage at that second input voltage-level is also designed to operate above a certain power conversion efficiency level for a low power level outputted from the VR. The DC power source has multiple cells to generate multiple different voltage-levels and may couple to the VR.

FIG. 1 illustrates a schematic diagram of an embodiment of a multiple input-voltage-level voltage-regulator (VR) 102 having two or more input stages to dynamically reconfigure selection between multiple input-voltages to control operating characteristics of the VR 102. In an embodiment, the buck VR 102 topology consists of three switches, a first switch 104 a second switch 108 and a third switch 106, and an output filter comprising of an inductor (L) and a capacitor (C) that time averages the input voltage to produce a lower voltage at its output. The power converting VR 102 may be used for delivering power to the various subsystems on a computing device's platform.

Figure 2:
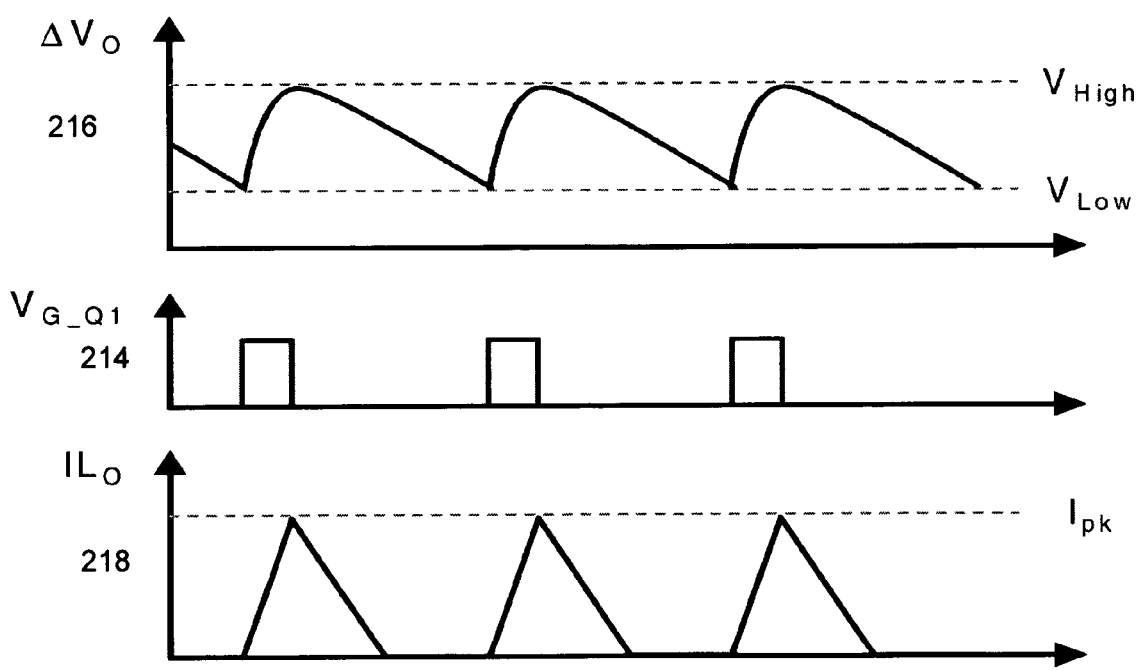
FIG. 2 illustrates a graph of an embodiment of a VR operating in skip mode operation.

FIG. 2 illustrates a graph of an embodiment of a VR 102 operating in skip mode operation. A select signal from the controller 214 may turn on a switch for a period in time to control the output voltage from the VR 216 and load current from the VR 218. The VR connects to an input supply voltage for a portion of the cycle and connects to ground potential (VSS) for a portion of the cycle to regulate an output parameter of the VR, such as voltage or current. A new switching cycle is initiated when the output voltage drops to a certain regulated threshold such as below VLOW. Referring to FIGS. 1 and 2, the main first switch 104 turns on from receiving a signal from the system controller 214 and delivers energy from the DC power supply 112 to the output (Vo). The inductor (L) builds a field to sustain the current output 218. The capacitor (C) increases in charge to raise the regulated output voltage 216. On the other hand, when the regulated output voltage 216 exceeds the high threshold VHIGH, the main first switch 104 is turned off and energy stored in the output inductive-capacitive filter supplies the energy to the load until it reaches the low threshold again. The second switch 108 connects to a ground potential voltage-level (VSS). The switching controller 110 offers the feature of skip mode operation at light loads, which allows the VR 102 to skip switching cycles when they are not needed.

For example, the power converting voltage regulator is trying to maintain a regulated output voltage 216 of a set point at 1.64 volts + or −0.41 V for the current load conditions with an input supply voltage (Vin1) of 8.2 volts. On average, in each duty cycle, the main first switch 104 turns on from receiving a signal from the system controller 214 twenty percent of the time to maintain a regulated voltage range of 2.05 volts to 1.23 volts. The main first switch 104 then remains off for eighty percent of that duty cycle.

The input stage third switch 106 receives an input-voltage-level (Vin2) different than the input voltage-level (Vin1) supplied to the first stage 120. The first stage 120 receives an input-voltage-level of 8.2 volts such as VDD max input supply voltage-level. The first stage 120 at that first input-voltage-level is, designed to operate above an eighty percent power conversion efficiency level for a high power level outputted from the VR 102 that maintains a design maximum load of twenty five percent or greater. Refer to graph of FIG. 3 for example efficiency number for the first stage 120. Similarly, the second stage 122 receives a second input voltage-level of 4.1 volts. The second stage 122 receives a second input voltage-level lower than the first input voltage-level. The second stage 122 at that second input voltage-level is also designed to operate above a certain power conversion efficiency level for a lower power level outputted from the VR 102 to maintain loads of less than twenty five percent design maximum load.

In our example above, the first switch 104 turns on from receiving a signal from the system controller twenty percent of the time to maintain a regulated range of 2.05 volts to 1.23 volts. Thus, the first switch 104 then remains off for eighty percent of that duty cycle resulting in a poor power conversion efficiency. The second stage 122 receives an input supply voltage of 4.1 volts. The third switch 106 receives a signal from the system controller 110 to turn on forty percent of the time to maintain the same regulated range of 2.05 volts to 1.23 volts. Thus, the third switch 106 then remains on to maintain the regulated voltage and current parameters for twice as long compared to the first switch 104 for the same power level outputted to maintain the load on the VR 102. Being maintained by the third switch 106 significantly increases the power conversion efficiency of the VR 102 based on load demand on the VR 102 over a wide range of load demand.

The VR 102 switches between two inputs, VIN1 (e.g. 8.2V) and VIN2 (e.g. 4.2V), depending on the load condition. At light loads, input voltage VIN2 is used in conjunction with reduced switching frequencies such that losses can be reduced to a large extent. As the load increases, the operation mode is switched to use VIN1 and higher switching frequencies. The combination of variable VIN and variable Fs can provide high efficiency operation over a wide load range.

Note, variable frequency operation can be implemented in many ways. Linear variations of frequency with load, pulse skipping, and hysteretic control are some of the common techniques. The switching controller 110 offers the feature of skip mode operation at light loads, which allows the VR 102 to skip switching cycles when they are not needed.

A single input-voltage-level voltage-regulator has the main disadvantage of low power conversion efficiency at light loads due to fixed losses in the power conversion. Power losses in a power converting voltage regulator are a combination of 1) conduction losses, which are proportional to current squared times the resistance of the components ($I^2 \times R$) making up the VR 102 and 2) switching losses, which are proportional to input voltage-level squared times the frequency switching ($V^2 \times Fs$) of turning on and off of the components in the VR 102.

Figure 3:
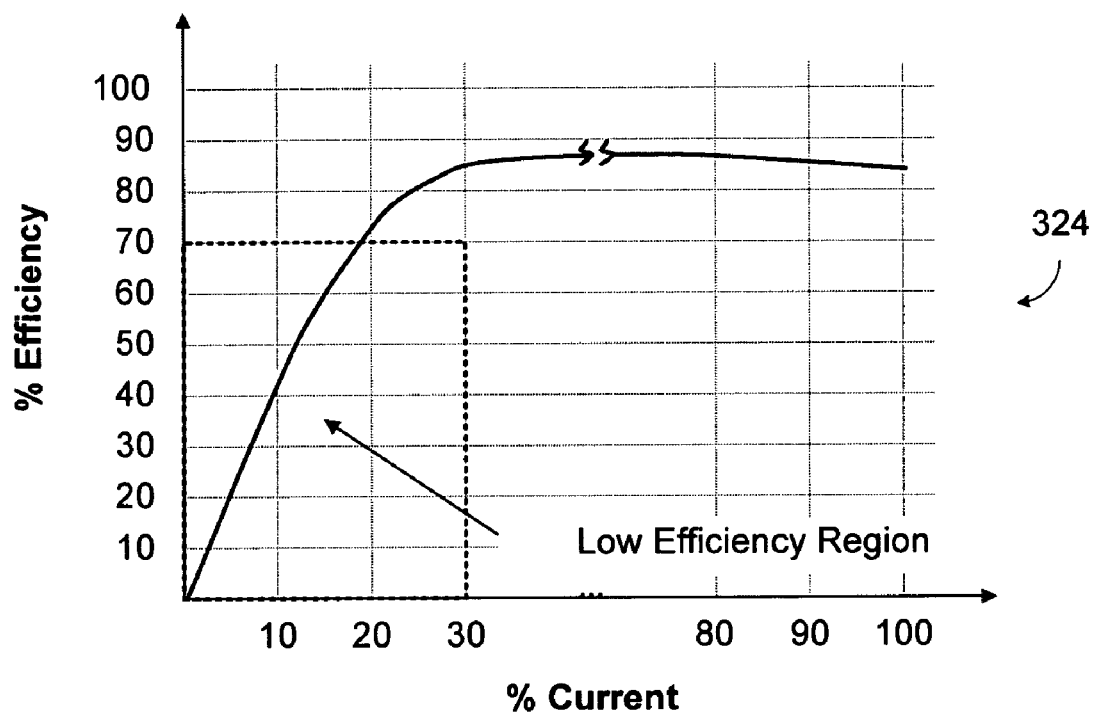
FIG. 3 illustrates a graph of a typical efficiency characteristic of the single input-voltage-level voltage-regulator.

FIG. 3 illustrates a graph of a typical efficiency characteristic of the single input-voltage-level voltage-regulator. The graph 324 illustrates that at light load conditions (loads<25%), the efficiency of the power converter starts dropping dramatically to levels less than 60%. Voltage Regulator's in mobile & handheld applications may operate in very light load conditions (<20%) most of the time. Hence, the power conversion losses at light load conditions can be very high resulting in increased average power being drawn from battery systems.

A major reason the efficiency of a power converting voltage regulator is worse at light load conditions is due to some constant losses due to the switching nature of the power converting voltage regulator. The switching losses of the buck power converting voltage regulator are well documented and can be represented as being proportional to $V^2 \times Fs$, where, as above, V is the input voltage-level and Fs is the frequency of operation. The switching losses can be reduced by a large amount if the input voltage and the switching frequency are decreased. In general, the switching frequency can be adjusted in a VR 102 by the system controller 110 without much difficulty.

Typically, a single input-voltage voltage-regulator may use a subsequent conversion stage as a source of its input voltage. In such a cascade configuration, comprised of two power conversion stages, the input of the first stage is fixed whereas the input of the second stage is variable making the losses of the second stage less. A subsequent conversion stage, however, introduces additional conversion losses. Yet, the additional conversion losses make the cascaded power conversion stages architecture inefficient. Furthermore, an additional discrete power conversion stage means an increase in board space and cost.

The one or more switches 106, 104 internal to the VR dynamically vary the operating characteristics of the VR by selecting one of the stages 120, 122 as its input stage. The one or more switches 106, 104 receive a selection signal from a system controller 110. The system controller 110 implements a control algorithm to determine the selection signal depending upon the group consisting of 1) measured current (i) load conditions to achieve above a specific efficiency level in power conversion; 2) measured voltage (v) load conditions to achieve above a specific efficiency level in power conversion; 3) a measured deviation of an output parameter from a regulated set point of that output parameter, (Note the system controller may select to turn on a switch to reduce the deviation by switching to a higher voltage source causing the magnitude of the response to the rate of change on the desired output voltage more rapidly return to its desired set point), 4) receiving an indication from a particular load communicating that anticipated load conditions may cause a transient deviation from the set point of the regulated output parameter due to a significant change in load demand.

Thus, the power-converting voltage-regulator (VR) 102 may have two or more input stages 120, 122 with each having its own input voltage-level. The VR may have one or more switches 104, 106 to select between the input voltage-levels to reduce power conversion losses in a computing system by selecting one of the input voltage-levels as an operating voltage for the VR based on load conditions. A detector 114 may measure load current and/or voltage-level being supplied from the VR 102. The system controller 110 sends a signal to the one or more switches 104, 106 to select between the input voltage-levels based on the measured load/parameter from the detector 104. The system controller 110 can also send a signal to the one or more switches 104, 106 to select between the input voltage-levels based on receipt of a signal indicating an anticipated load change. The DC power source 112 may directly supply at least one of the voltage-level inputs of the VR 102 via a power rail.

As discussed, a sudden change in load demand may vary the regulated output parameters, such as voltage or current, of the VR 102. The regulated output parameters are maintained at a set point with a certain range of tolerance from that set point. The system controller 110 may switch to a higher input voltage level to increase the response rate to transient deviations due to these sudden changes in load demand.

One of the key factors to increase battery life is the amount of average power drawn from the battery. Average power drawn should be limited to a low value to ensure higher battery life. Thus, a typical mobile laptop or any other portable device spends most of its time in very low power modes (idle and standby states). However, some Voltage Regulators (VR) that feed the different components exhibit higher losses at low power outputs since they are usually designed to operate efficiently at merely higher power levels. A reconfigurable VR may use diverse input voltage-levels and different circuit configurations based on load conditions. The reconfigurable VR topology and a split-battery with multiple tapped cells can be used adaptively based on the load requirements to minimize losses. The multiple stage reconfigurable VR provides a way to increase the efficiency of VR's at light load conditions, which in turn reduces the average power consumed by portable applications. The reconfigurable VR provides a way to increase battery life and drive truly mobile platforms.

Figure 4A:
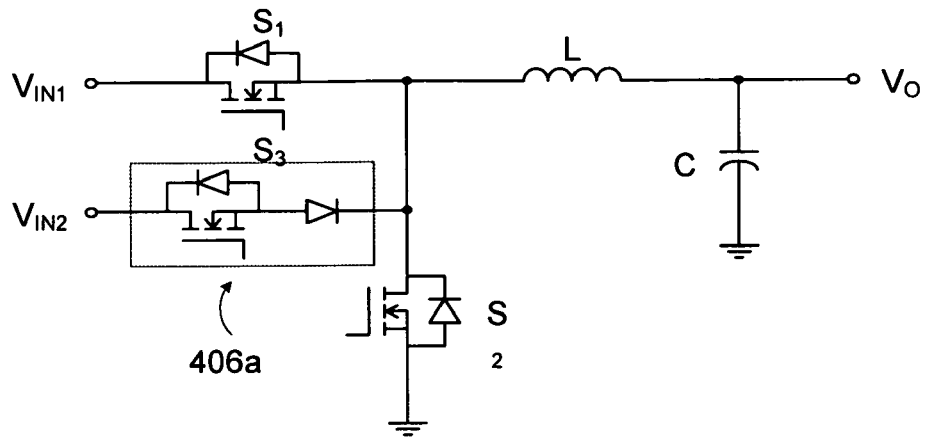
FIGS. 4a-4c illustrate schematic diagrams of embodiments of VRs having two or more input stages to dynamically reconfigure selection between multiple input-voltages.
Figure 4B:
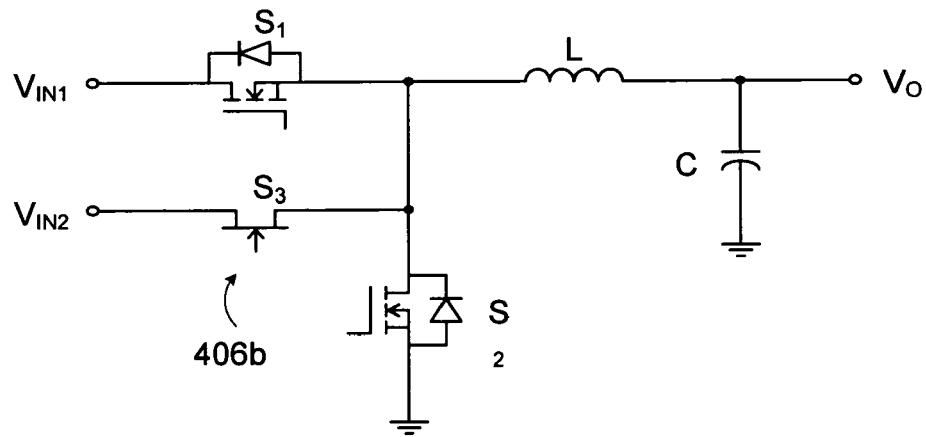
Figure 4C:
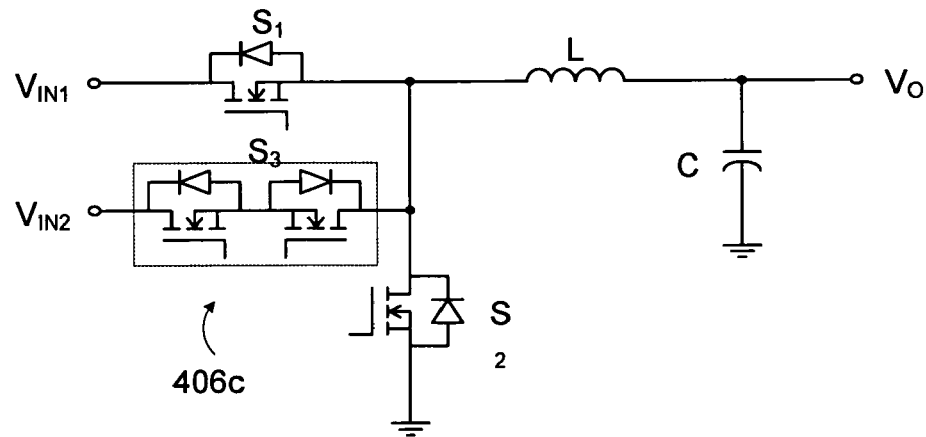

FIGS. 4a-4c illustrate schematic diagrams of embodiments of VRs having two or more input stages to dynamically reconfigure selection between multiple input-voltages. The VRs includes input voltage stages similar to FIG. 1. FIG. 4a shows the third switch 406a consists of a MOSFET with an additional diode in series. FIG. 4b shows the third switch 406b consists of a switch that does not inherently have a reverse body diode like a MOSFET. For example, a junction FET (JFET) can be used. FIG. 4c shows the third switch 406c consists of MOSFET back-to-back in series with a second MOSFET. Thus, the third switch S3 may consist of 1) a Metal Oxide Semiconductor Field Effect Transistor (MOSFET) in series with a reverse-biased diode, 2) a Junction FET (JFET), 3) a first MOSFET back-to-back in series with a second MOSFET, or similar switch arrangement.

In an embodiment, the system controller ensures both the third switch and the first switch are not turned on at the same time since there would be a direct electrical short circuit between VIN1 & VIN2. In addition, since VIN2 is always different than VIN1, a MOSFET similar to the first switch should not be directly used for the third switch because of its body diode conduction.

Note, a MOSFET is a type of field effect transistor. A MOSFET can be either NMOS (n-channel) or PMOS (p-channel) transistor. The "field-effect" in FET is the electromagnetic field that is generated when the gate electrode is energized, causing the transistor to turn on or off. Thus, FETs use a gate element that, when charged, creates an electromagnetic field that changes the conductivity of a silicon channel and turns the transistor on or off. Therefore, the system controller may cause the selection signal to bias the gate of each switch to turn them on and off. In NMOS transistors, the silicon channel between the source and drain is of p-type silicon. When a positive voltage is placed on the gate electrode, it repulses the holes in the p-type material forming a conducting (pseudo n-type) channel and turning the transistor on. A negative voltage turns the transistor off. With a PMOS transistor, the opposite occurs. A positive voltage on the gate turns the transistor off, and a negative voltage turns it on. NMOS transistors switch faster than PMOS. Similar to MOSFETs are JFETs (junction FETs), which use a PN junction gate rather than a poly-crystalline gate.

Figure 5:
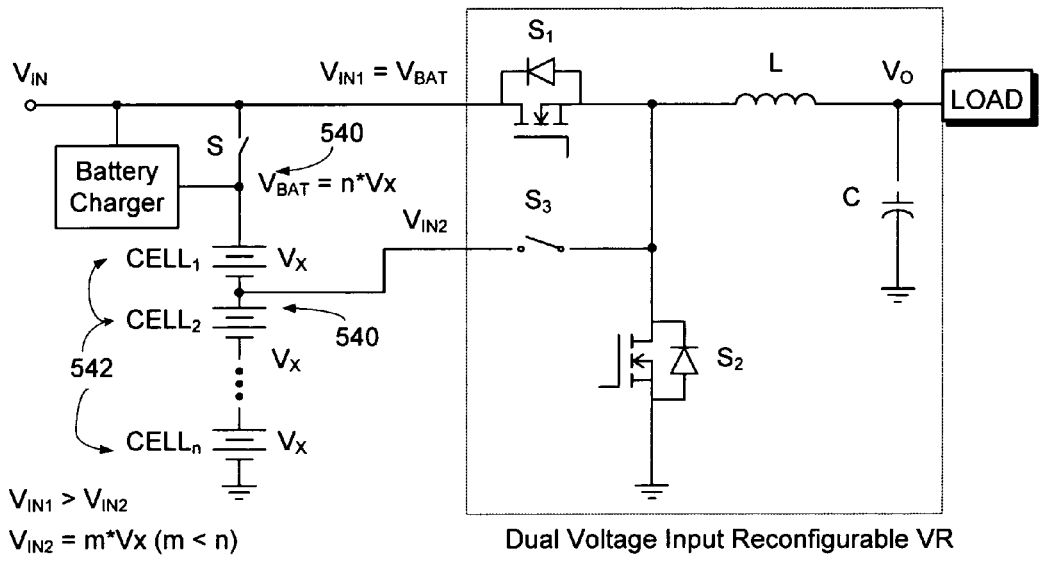
FIG. 5 illustrates a schematic diagram of an embodiment of a battery with multiple battery cells to generate two or more levels of DC voltage.

FIG. 5 illustrates a schematic diagram of an embodiment of a battery with multiple battery cells to generate two or more levels of DC voltage. Each cell 542 can have its own output terminal 540 to enable connecting to multiple discrete voltage-levels from this single DC power source. The battery voltage VBAT is comprised of (n*VX) where VX is the voltage of each cell 542. The higher input voltage VIN1 is equal to the battery voltage (=n*VX). The lower input voltage VIN2 is comprised of "m" cell voltages (=m*VX) where "m" is some number of cells less than "n". Depending on the voltage-level required, the number of cells "m" can be chosen. The split-battery voltage input configuration can provide multiple input voltages for use with voltage regulators. The split battery architecture can be used in any portable system that is comprised of a battery with multiple cells in series. For a battery pack comprised of "n" cells connected in series, the higher input voltage VIN1 is equal to n×Vx and the lower input voltage VIN2 is equal to m×Vx, where Vx is the voltage in each cell and "m" is the number of cells that can be chosen depending on the input voltage required.

Figure 6:
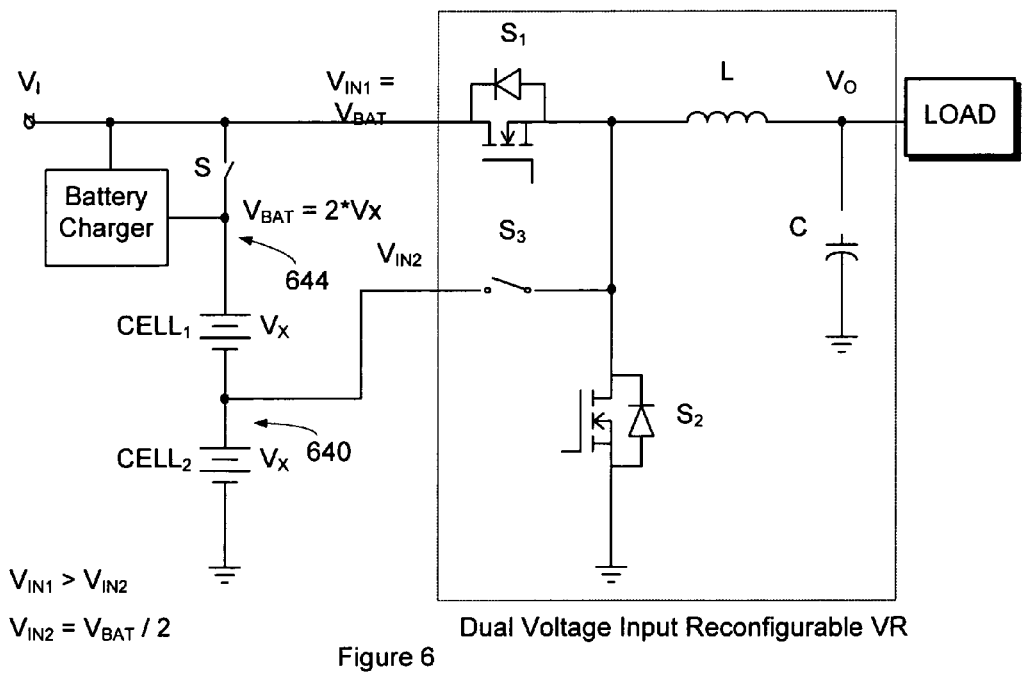
FIG. 6 shows a schematic diagram of an embodiment of a simple two-cell battery structure that uses two taps to provide two input voltage-levels for the VR.

FIG. 6 shows a schematic diagram of an embodiment of a simple two-cell battery structure that uses two taps to provide two input voltage-levels for the VR. The second voltage-level from the second terminal 640 is one half of the battery voltage from the first terminal 644. The two-cell battery structure provides a dual voltage-level input such that VIN1 corresponds to the whole battery pack voltage and VIN2 corresponds to half of such voltage. However, one can use many taps (one for each cell at the most) to derive multiple input voltage rails to many voltage regulators. In this way, using the most appropriate input voltage-level can efficiently operate different VRs that are present in a PC platform.

The split-battery configuration when used along with the multiple voltage input reconfigurable VR provides significant benefit to increase battery life due to increased efficiency at light loads. Nevertheless, since lower cells are used more consistently than the upper ones, special care should be taken when designing the battery charger to ensure that charging of proposed battery cell structure is accomplished appropriately. Cells of different capacities can also be used to reduce the imbalance in charge between cells.

Figure 7:
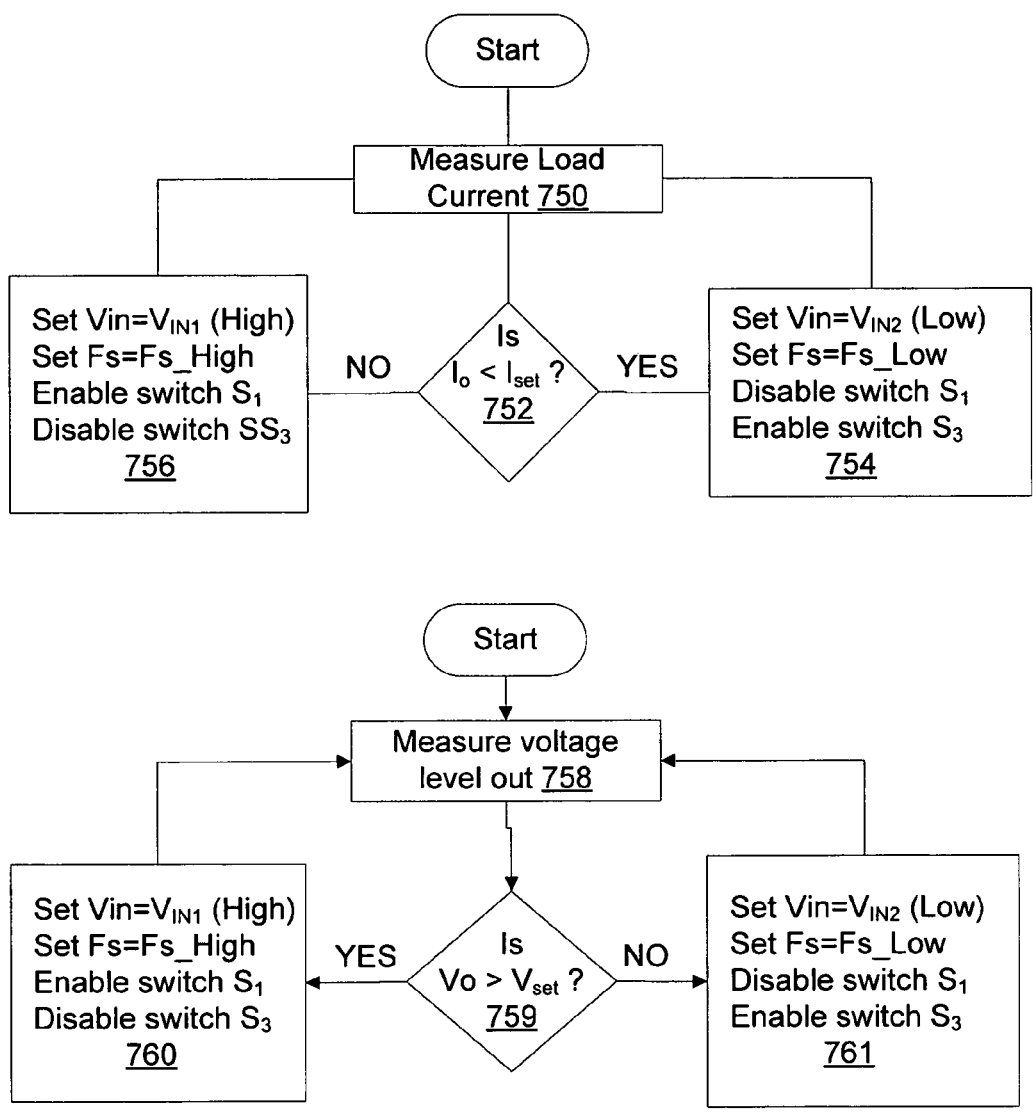
FIG. 7 illustrates a flow chart of an embodiment of a control algorithm implemented in the system controller.

FIG. 7 illustrates a flow chart of an embodiment of a control algorithm implemented in the system controller. In block 750, the operating conditions of the VR can change as a function of the load. Therefore, the output current should be sensed to determine the transition time from one input voltage to another. In block 752, the output current (10) is sensed and compared to a given set point current (Iset). In block 754, if the measured current is less than the set point, the controller determines that the converter should be in a light load condition and selects the appropriate action: e.g. disables the first input stage S1; enables the second input stage S3 thus selecting VIN2; and also reduces the switching frequency. In block 756, on the other hand, if the load current is higher than the set point, the opposite action is selected: disables the second input stage S3, enables the first input stage S1 thus linking VIN1, and increases the switching frequency. By doing this consistently as a function of load, a flat efficiency can be obtained from light load to full load conditions. The advantage of the variable input is that both the input voltage and the switching frequency can be used as independent variables to maintain a high efficiency over a wide load range. A similar control algorithm 758-761 exists for the measured voltage output parameter.

The control algorithm can reside either in logic in the VR controller itself, a software based system controller or a processing unit such as a microprocessor, chipset, etc. Thus, the system controller may be software instructions embedded on a computer readable medium coded to dynamically vary the operating voltage of the VR depending on system load conditions to achieve high efficiency of 85% or better in power conversion. The software instructions may also dynamically vary the operating voltage-level of the VR depending on system load conditions in order to hasten a response rate to transient deviations in system load conditions.

FIGS. 8a-8c illustrate a schematic diagram and corresponding chart and table for a variable input voltage and a variable frequency operation of an embodiment of the VR. The chart 862 and table 860 display the analytical results of the efficiency for an embodiment of the VR under the two different modes of operation. Under normal operating conditions with a high power consumption load, the synchronous VR operates in the Continuous Conduction Mode (CCM) with VIN=, for example, 12V & Fs=300 KHz. The efficiency of the converter (indicated with a 1) drops rapidly when the load current is less (~10% of full load). The efficiency can be improved by a very small value if the VR is operated in the Discontinuous Conduction Mode (DCM) at light loads (by ~1%) with VIN & Fs unchanged at 12V & 300 KHz respectively. This line is indicated with a 2. However, it can be seen that there is a big improvement in the light load efficiency (by about 20%) when the switching frequency is reduced to 75 KHz while the input voltage is maintained at 12V. This line is indicated with a 3. The last case illustrates that a further improvement of 10% efficiency can be obtained by reducing the input voltage (VIN=3V) in conjunction with reduction in switching frequency (Fs=75 KHz). It is to be noted that the results shown is one embodiment of the invention. This line is indicated with a 4. Various combinations of the switching frequency and input voltage can be adjusted to obtain a flat efficiency curve. The set point of the current (Iset) that determines the mode switch over can be determined based on the requirements of individual VR implementations.

Although 2 input voltage-levels and 2 switching frequency levels were shown to illustrate the advantages of the proposed solution, this concept can be used with multiple voltage-levels and multiple switching frequency to maintain high efficiency.

The VR receives variation of the input voltage and the switching frequency based on load conditions to provide a method that maintains high efficiency over a wide range of loads. The VR maintains a substantially flat-line efficiency range from light load to full load to maintain high efficiency over a wide range of load. High efficiency at light loads increases the battery life of mobile systems as well as increases energy efficiency in desktop and server systems. In essence, higher performance can be gained for a given amount of power consumed. The VR minimizes the conversion losses associated with delivering power to semiconductors at light load conditions to achieve high light load efficiency by dynamically changing operating parameters.

As discussed, the VR also increases energy efficiency in desktop or server power converters. Increased energy efficiency at light loads can help meet tight energy efficiency regulation at standby or idle mode conditions. Note, When designing a DC/DC converter with different operation conditions in which the switching frequency will be changed, it is important to take into account the worse case in terms of the output voltage ripple. Actual voltage ripple is not only caused by the capacitor discharge, but also by the voltage drop across the equivalent series resistance of the output capacitor.

Figure 9:
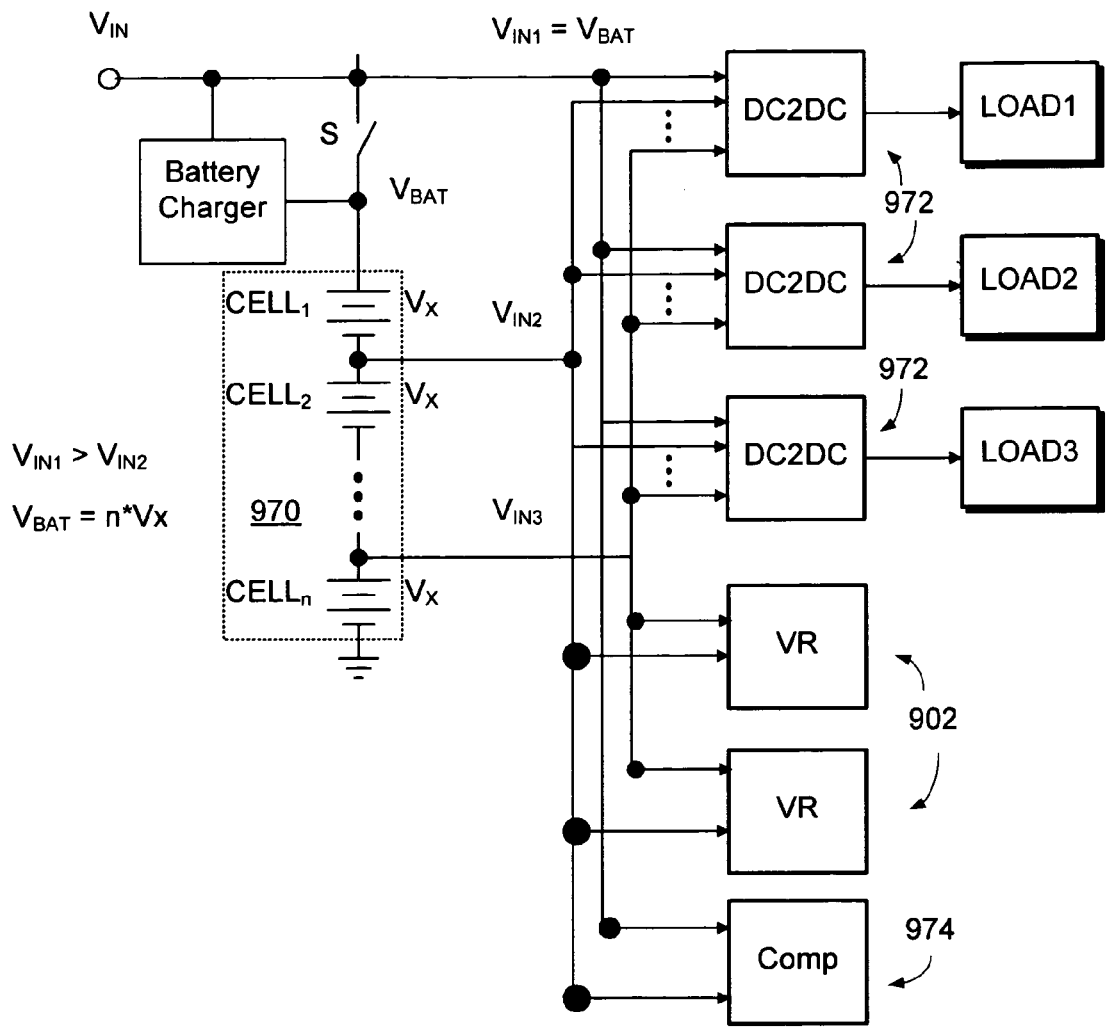
FIG. 9 illustrates a schematic diagram of an embodiment of single DC power source with multiple cells to generate two or more levels of DC voltage to a system of components.

FIG. 9 illustrates a schematic diagram of an embodiment of single DC power source with multiple cells and corresponding taps to generate two or more levels of DC voltage to a system of components. The single split-battery 970 configuration may be used for supplying multiple VRs 902, supplying multiple voltage rails to other conventional voltage regulators 972, and supplying multiple voltage rails to other conventional components 974. The level of voltage used can help in increasing the efficiency of the power system by reducing the ratio of the output voltage-levels to that of the input voltage. Specifically the split-battery configuration when used with the Reconfigurable Dual (or multiple) Input VR provides significant benefit to increase efficiency at light load conditions. Note, lower cells are used more consistently than the upper ones. Thus, care should be taken to ensure that charging of the multiple battery cell structure is accomplished appropriately. In an embodiment, the DC power source with multiple cells may be two or more discrete batteries connected in series with output connections to terminals at each battery-to-battery junction.

The DC power source may also be a fuel cell with multiple hydrogen cells to generate two or more levels of DC voltage. Each hydrogen cell having its own output terminal to enable connecting to this DC power source. The fuel cell is an electrochemical device similar to a battery, but differing from the latter in that it is designed for continuous replenishment of the reactants consumed; i.e. the fuel cell produces electricity from a fuel supply of hydrogen and oxygen that may be externally replenished as opposed to the limited internal energy storage capacity of a battery. Additionally, the electrodes within a battery react and change as a battery is charged or discharged, whereas a fuel cell's electrodes are catalytic and relatively stable. Typical reactants used in a fuel cell are hydrogen on the anode side and oxygen on the cathode side (a hydrogen cell). Usually, reactants flow in and reaction products flow out. Virtually continuous long-term operation is feasible as long as these flows are maintained.

Some additional examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Figure 10:
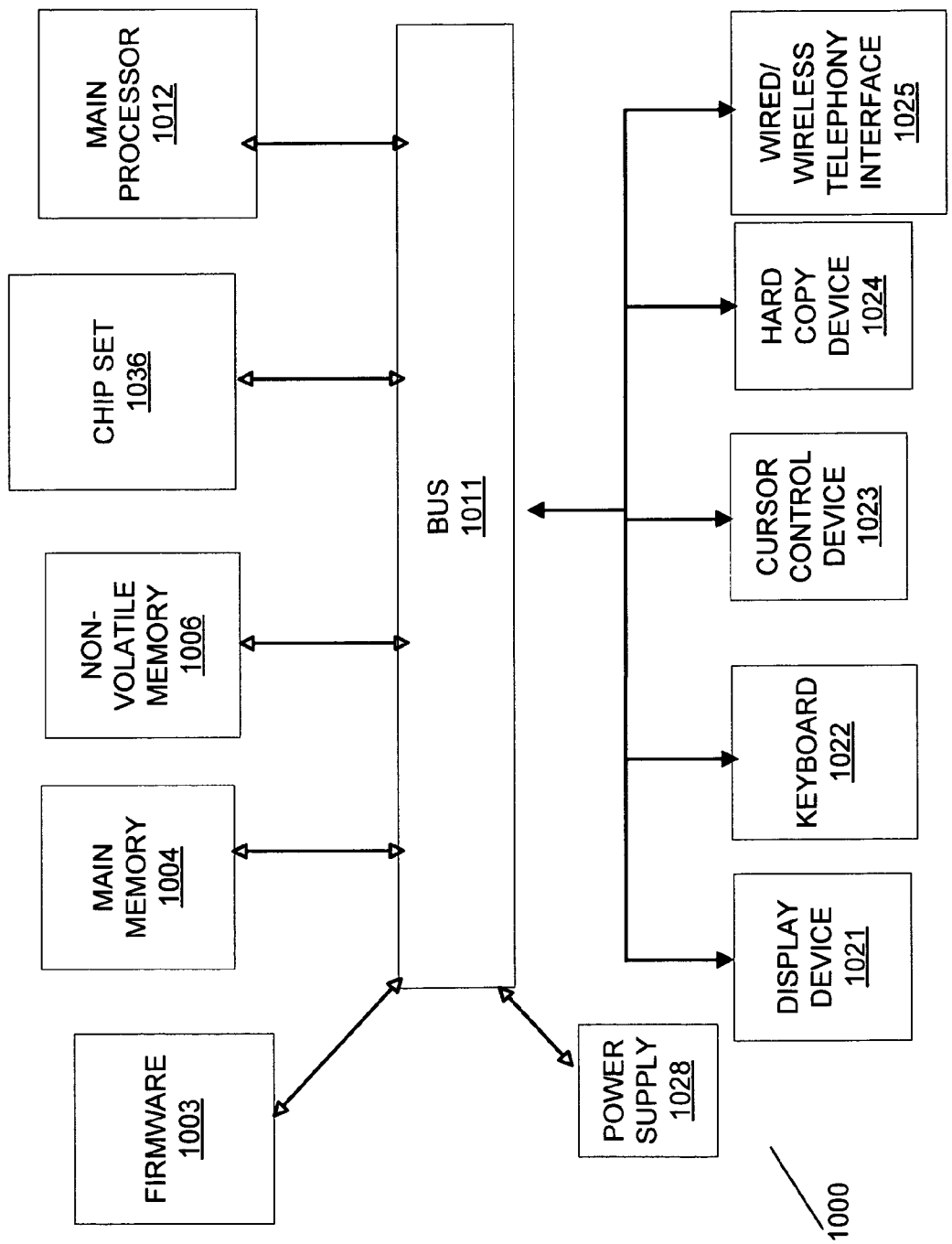
FIG. 10 illustrates a block diagram of an example computer system that may use an embodiment of the VR and DC power supply with multiple cells.

FIG. 10 illustrates a block diagram of an example computer system that may use an embodiment of the VR and DC power supply with multiple tapped cells. In one embodiment, computer system 1000 comprises a communication mechanism or bus 1011 for communicating information, and an integrated circuit component such as a main processing unit 1012 coupled with bus 1011 for processing information. One or more of the components or devices in the computer system 1000 such as the main processing unit 1012 or a chip set 1036 may use an embodiment of the VR. The main processing unit 1012 may consist of one or more processor cores working together as a unit.

Computer system 1000 further comprises a random access memory (RAM) or other dynamic storage device 1004 (referred to as main memory) coupled to bus 1011 for storing information and instructions to be executed by main processing unit 1012. Main memory 1004 also may be used for storing temporary variables or other intermediate information during execution of instructions by main processing unit 1012. The main memory 1004 as well as the other components in the computing system may use the VR.

Firmware 1003 may be a combination of software and hardware, such as Electronically Programmable Read-Only Memory (EPROM) that has the operations for the routine recorded on the EPROM. The firmware 1003 may embed foundation code, basic input/output system code (BIOS), or other similar code. The firmware 1003 may make it possible for the computer system 1000 to boot itself.

Computer system 1000 also comprises a read-only memory (ROM) and/or other static storage device 1006 coupled to bus 1011 for storing static information and instructions for main processing unit 1012. The static storage device 1006 may store OS level and application level software.

Computer system 1000 may further be coupled to or have an integral display device 1021, such as a cathode ray tube (CRT) or liquid crystal display (LCD), coupled to bus 1011 for displaying information to a computer user. A chipset may interface with the display device 1021.

An alphanumeric input device (keyboard) 1022, including alphanumeric and other keys, may also be coupled to bus 1011 for communicating information and command selections to main processing unit 1012. An additional user input device is cursor control device 1023, such as a mouse, trackball, trackpad, stylus, or cursor direction keys, coupled to bus 1011 for communicating direction information and command selections to main processing unit 1012, and for controlling cursor movement on a display device 1021. A chipset may interface with the input output devices. Similarly, devices capable of making a hardcopy, 1024 of a file, such as a printer, scanner, copy machine, etc. may also interact with the input output chipset and bus 1011.

Another device that may be coupled to bus 1011 is a power supply such as the battery with multiple cells, a fuel cell with multiple cells, and/or an AC adapter circuit. Furthermore, a sound recording and playback device, such as a speaker and/or microphone (not shown) may optionally be coupled to bus 1011 for audio interfacing with computer system 1000. Another device that may be coupled to bus 1011 is a wireless communication module 1025. The wireless communication module 1025 may employ a Wireless Application Protocol to establish a wireless communication channel. The wireless communication module 1025 may implement a wireless networking standard such as Institute of Electrical and Electronics Engineers (IEEE) 802.11 standard, IEEE std. 802.11-1999, published by IEEE in 1999.

In one embodiment, the software used to facilitate the control algorithm routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While some specific embodiments of the invention have been shown the invention is not to be limited to these embodiments. For example, most functions performed by electronic hardware components such as logic may be duplicated by software emulation. Thus, a software program written to accomplish those same functions may emulate the functionality of the hardware components in input-output circuitry. Further combinations of logic and software may be used to accomplish that function. The invention is to be understood as not limited by the specific embodiments described herein, but only by scope of the appended claims.

We claim:

1. An apparatus, comprising:
a multiple input-voltage level voltage-regulator (VR) to dynamically reconfigure selection between the multiple input-voltages to control operating characteristics of the VR selected from the group consisting of 1) power conversion efficiency based on load demand on the VR, or 2) response rate to a transient deviation from a regulated output parameter of the VR based on either measured load or receipt of a signal indicating an anticipated load change, wherein the VR having a first stage to receive a first input-voltage level, where the first stage at that first input-voltage level is designed to operate above a first power conversion efficiency level for a first power level outputted from the VR, and a second stage to receive a second input voltage level, wherein the second stage at that second input voltage level is designed to operate above a second power conversion efficiency level for a second power level outputted from the VR, where the first power level is different than the second power level; and
a system controller to select between the multiple input voltages and to control a switching frequency of the VR to maintain substantially flat-line power conversion efficiency from light load to full load conditions in the VR.

2. The apparatus of claim 1, further comprising:
one or more switches internal to the VR to dynamically vary the operating characteristics of the VR by selecting one of the stages as its input stage, wherein the one or more switches receive a selection signal from the system controller.

3. The apparatus of claim 2, wherein the system controller determines the selection signal depending upon the group consisting of 1) measured current (i) load conditions to achieve above a specific efficiency level in power conversion, measured voltage (v) load conditions to achieve above a specific efficiency level in power conversion, a measured deviation of an output parameter from a regulated set point of that output parameter, or receiving an indication from a first load communicating that anticipated load conditions may cause a transient deviation from the set point of the regulated output parameter due to a change in load demand.

4. The apparatus of claim 2, wherein the one or more switches further comprises:
a first switch to receive a first input voltage level, a second switch to receive a ground potential voltage level, and a third switch to receive second input voltage level lower than the first input voltage level.

5. The apparatus of claim 4, wherein the third switch is one selected from the group consisting of 1) a MOSFET in series with a reverse biased diode, 2) a JFET, or 3) a first MOSFET back-to-back in series with a second MOSFET.

6. The apparatus of claim 1, further comprising:
a Direct Current (DC) power source of a mobile computing platform coupled to the VR, wherein the DC power source is a battery with multiple battery cells to generate two or more levels of DC voltage where a first cell has a first output terminal and a second cell has a second output terminal to enable connecting to multiple voltage levels from this single DC power source.

7. The apparatus of claim 1, further comprising:
a Direct Current (DC) power source of a mobile computing platform coupled to the VR, wherein the DC power source is a fuel cell with multiple hydrogen cells to generate two or more levels of DC voltage, where a first cell has a first output terminal and a second cell has a second output terminal to enable connecting to multiple voltage levels from this single DC power source.

8. The apparatus of claim 1, further comprising:
a detector to monitor the load demand on the VR and supply a feedback signal to the system controller.

9. A method, comprising:
controlling operating characteristics of voltage regulator (VR) selected from the group consisting of 1) power conversion efficiency based on load demand on the VR or 2) response rate to a transient deviation from a regulated output parameter of the VR based on either measured load or receipt of an indication from a first load communicating that anticipated load conditions may cause the transient deviation from a set point of the regulated output parameter due to a change in load demand; and
selecting a switching frequency and input voltage-level from two or more input voltages to control the operating characteristics of the VR in computing device; and
receiving a selection signal to select one of the input voltage levels as an operating voltage for the VR; and
setting a switching frequency in the VR according to the selected operating frequency to maintain substantially flat-line power conversion efficiency from light load to full load conditions in the VR.

10. The method of claim 9, further comprising:
measuring load current being supplied from the VR; and
sending the selection signal to the VR to select between the input voltage levels based on the measured load current.

11. The method of claim 9, further comprising:
measuring voltage level being supplied from the VR; and
sending the selection signal to the VR to select between the input voltage levels based on deviation of the measured voltage level from a set point voltage level.

12. A system, comprising:
a power-converting voltage-regulator (VR) having two or more inputs with each having its own input voltage level and one or more switches to select between the input voltage levels to reduce power conversion losses in a mobile computing system by selecting one of the input voltage levels as an operating voltage for the VR;
a detector to measure a load parameter being supplied from the VR;
a system controller to send a signal to the one or more switches to select between the input voltage levels based on the measured load parameter and to control a switching frequency of the VR to maintain substantially flat-line power conversion efficiency from light load to full load conditions in the VR; and
a Direct Current (DC) power source of the mobile computing platform coupled to at least one of the inputs of the VR.

13. The system of claim 12, wherein the one or more switches further comprises:
a first switch to receive a first input voltage level, a second switch to receive a ground potential voltage level, and a third switch to receive second input voltage level lower than the first input voltage level.

14. The system of claim 13, wherein the third switch is one selected from the group consisting of 1) a MOSFET in series with a reverse-biased diode, 2) a JFET, a first MOSFET back-to-back in series with a second MOSFET.

15. The system of claim 12, wherein the system controller includes software instructions embedded on a computer readable medium coded to dynamically select the operating voltage of the VR depending on system load conditions to achieve above a specific efficiency level in power conversion.

16. The system of claim 12, wherein the system controller includes software instructions embedded on a computer readable medium coded to dynamically select the operating voltage level of the VR depending on system load conditions in order to hasten a response rate to transient deviations in system load conditions.

17. The system of claim 12, wherein the DC power source is a battery with multiple battery cells to generate two or more levels of DC voltage, where a first cell has a first output terminal and a second cell has a second output terminal to enable connecting to multiple voltage levels from this single DC power source.

18. The system of claim 12, wherein the mobile computing device is a laptop computer with a wireless communication module coupled to the DC power source.

19. The system of claim 12, wherein the detector to measure a load current being supplied from the VR and the system controller to send the signal to the one or more switches to select between the input voltage levels based on the measured load current.

20. A machine readable medium storing instructions, which when executed by the machine, to cause the machine to perform the following operations, comprising:
controlling operating characteristics of voltage regulator (VR) selected from the group consisting of 1) power conversion efficiency based on load demand on the VR or 2) response rate to a transient deviation from a regulated output parameter of the VR based on either measured load or receipt of an indication from a first load communicating that anticipated load conditions may cause the transient deviation from a set point of the regulated output parameter due to a change in load demand; and
selecting a switching frequency and an input voltage-level from two or more input voltages to control the operating characteristics of the VR in computing device;
sending a selection signal to select one of the input voltage levels as an operating voltage for the VR; and
setting a switching frequency of the VR according to the selected switching frequency to maintain substantially flat-line power conversion efficiency from light load to full load conditions in the VR.

21. The computer readable medium storing instructions of claim 20, to cause the machine to perform further operations, comprising:
receiving measured load current being supplied from the VR; and
sending the selection signal to the VR to select between the input voltage levels based on the measured load current.

22. The computer readable medium storing instructions of claim 20, to cause the machine to perform further operations, comprising:
receiving measured voltage level being supplied from the VR; and
sending the selection signal to the VR to select between the input voltage levels based on deviation of the measured voltage level from a set point voltage level.

* * * * *